(12) United States Patent
Ono et al.

(10) Patent No.: US 11,081,899 B2
(45) Date of Patent: Aug. 3, 2021

(54) BATTERY SYSTEM

(71) Applicant: Yazaki Corporation, Tokyo (JP)

(72) Inventors: Chihiro Ono, Shizuoka (JP); Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 97 days.

(21) Appl. No.: 16/515,657

(22) Filed: Jul. 18, 2019

(65) Prior Publication Data

US 2020/0028375 A1    Jan. 23, 2020

(30) Foreign Application Priority Data

Jul. 19, 2018  (JP) .............................. JP2018-135463
May 22, 2019  (JP) .............................. JP2019-096007

(51) Int. Cl.
*H02J 7/00* (2006.01)

(52) U.S. Cl.
CPC .......... *H02J 7/0069* (2020.01); *H02J 7/0013* (2013.01); *H02J 7/0068* (2013.01)

(58) Field of Classification Search
USPC .................................................. 320/116, 132
See application file for complete search history.

(56) References Cited

U.S. PATENT DOCUMENTS

| | | | | |
|---|---|---|---|---|
| 4,849,682 A * | 7/1989 | Bauer | ................... | H02J 7/0024 320/106 |
| 5,917,308 A * | 6/1999 | Brooke | ................. | H02J 7/0068 320/118 |
| 7,825,629 B2 * | 11/2010 | Studyvin | ............... | H02J 7/0016 320/122 |
| 8,502,503 B2 * | 8/2013 | Densham | .............. | H02J 7/0013 320/122 |
| 9,373,970 B2 * | 6/2016 | Feuerstack | .............. | B60L 58/21 |
| 2011/0221394 A1 * | 9/2011 | Shigemizu | .......... | H01M 10/482 320/118 |
| 2011/0279085 A1 * | 11/2011 | Shigemizu | ............ | H02J 7/0016 320/117 |
| 2012/0013180 A1 * | 1/2012 | Muto | ...................... | B60L 58/19 307/9.1 |

(Continued)

FOREIGN PATENT DOCUMENTS

| | | |
|---|---|---|
| JP | 2013-240155 A | 11/2013 |
| JP | 5615995 B1 | 10/2014 |

*Primary Examiner* — Samuel Berhanu
(74) *Attorney, Agent, or Firm* — Kenealy Vaidya LLP (57) ABSTRACT

A battery system includes a battery circuit group in which a plurality of battery circuits, each including a plurality of battery units including a battery and a switching unit connected in series, are connected in parallel, and a control unit that controls the switching unit. The switching unit switches a state of the battery unit between a first state, in which the battery is connected between a positive electrode end and a negative electrode end of the battery unit, and a second state, in which the positive electrode end and the negative electrode end are connected without the battery. When discharging, the control unit controls the switching unit such that the state of the battery unit including the battery determined to be not fully discharged becomes the first state, and the state of the battery unit including the battery determined to be fully discharged becomes the second state.

13 Claims, 7 Drawing Sheets

(56) References Cited

U.S. PATENT DOCUMENTS

2012/0319658 A1\* 12/2012 White .................. H02J 7/0021
320/134
2013/0249317 A1 9/2013 Kang et al.
2013/0302657 A1 11/2013 Itakura
2017/0214253 A1\* 7/2017 Kim ..................... H02J 7/0013

\* cited by examiner

BATTERY SYSTEM

TECHNICAL FIELD

The present invention relates to a battery system.

BACKGROUND ART

Conventionally, as a battery system mentioned above, a storage battery system which judges the degradation of a battery and can replace the degraded battery with a spare battery is known (Patent Literature 1).

By the way, a used battery may be mounted as a battery mentioned above. The state of deterioration of the used battery differs depending on the usage of the user. In general, a battery whose deterioration has advanced has a reduced battery capacity, and therefore, a power capacity capable of charging and discharging is smaller than that of a battery which is not deteriorated.

If batteries in different deterioration states are mixed and connected in series, the batteries that have deteriorated during charge/discharge will be initially fully charged or fully discharged. In this case, even if the remaining capacity of the other batteries remains, charging and discharging must be stopped, and there is a problem that the battery capacity cannot be used up.

Therefore, conventionally, a new battery system has been configured by selecting batteries having the same deterioration state. In this case, a battery system composed of batteries in different deterioration states is difficult to be realized as a product because the battery capacity of the battery system is different. Therefore, it was necessary to collect batteries with the same degradation state to support the number of products manufactured. In this case, a battery system composed of batteries in different deterioration states also occurs, and it was necessary to consider different products corresponding to these. From the above, it is necessary to have a large storage for sorting and pooling batteries, which makes cost reduction difficult.

PRIOR ART DOCUMENT

Patent Literature

Patent Literature 1: JP 2013-240155 A

SUMMARY OF INVENTION

Technical Problem

Figure 1:
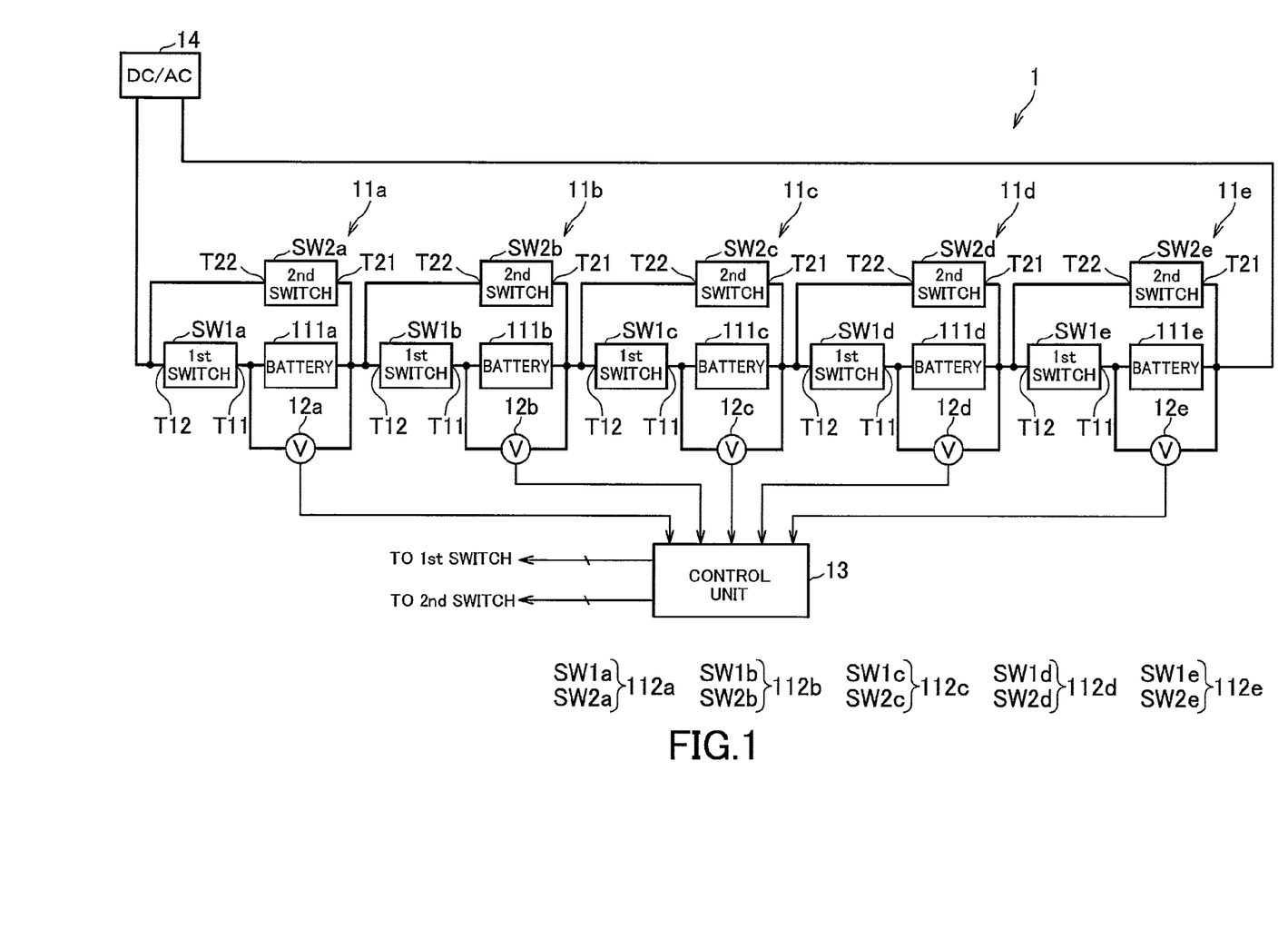
FIG. 1 is a circuit diagram showing a battery system of the present invention in a first embodiment.

For example, in the case of the battery system having the configuration shown in FIG. 1, the capacity of all the batteries can be sufficiently used even if the batteries in different deterioration states are mixed. In this battery system, a switch for blocking is arranged in series with each battery, and a switch for bypass is arranged in parallel with each battery. Therefore, when the battery is fully charged or fully discharged, it is possible to separate it from other batteries by cutting off the fully charged or fully discharged battery with the switch turned off, and with the switch for bypass turned on. Even if some batteries are fully charged or fully discharged, it is possible to continue charging and discharging other batteries.

However, in the above-described battery system, during discharge, while the operation of disconnecting the fully discharged battery is being performed, that is, until the cutoff switch is turned off and the bypass switch is turned on, power supply to the load will stop.

The present invention has been made in view of the above background, and an object of the present invention is to provide a battery system capable of continuing to supply power to a load even while operating to disconnect a fully discharged battery.

Solution to Problem

According to one aspect of the present invention, there is provided a battery system comprising:

a battery circuit group in which a plurality of battery circuits connected in parallel, each including a plurality of battery units connected in series, each including a positive electrode end, a negative electrode end, a battery and a switching unit; and a control unit that determines a charge state of the battery and controls the switching unit based on the determined charge state, wherein in each of the battery units, the switching unit switches a state of the battery unit between a first state, in which the battery is connected between the positive electrode end and the negative electrode end, and a second state, in which the positive electrode end and the negative electrode end are connected without the battery, wherein when discharging of the battery circuit group, the control unit controls the switching unit such that the state of the battery unit including the battery determined to be not fully discharged becomes the first state, and the state of the battery unit including the battery determined to be fully discharged becomes the second state, and wherein each of the battery circuits has a diode connected in series with the plurality of battery units such that a discharge direction of the battery is a forward direction.

Preferably, the control unit determines that the battery is not fully discharged when a voltage across the battery is greater than a predetermined discharge termination voltage, and determines that the battery is fully discharged when the voltage across the battery is less than or equal to the predetermined discharge termination voltage.

Preferably, each of the plurality of battery circuits further includes a bypass switch connected in parallel with the diode, and the control unit controls the switching unit such that when charging of the battery circuit group, the state of the battery unit including the battery determined to be not fully charged becomes the first state, and the state of the battery unit including the battery determined to be fully charged becomes the second state.

Preferably, the control unit determines that the battery is not fully charged when the voltage across the battery is less than a predetermined charge termination voltage, and determines that the battery is fully charged when the voltage across the battery is equal to or greater than the predetermined charge termination voltage.

Preferably, the control unit controls the bypass switches such that only one bypass switch of the battery circuit is turned on, and controls the bypass switch so as to sequentially charge the plurality of battery circuits by controlling the bypass switch such that the bypass switch is turned off when it is determined that all the batteries in the battery circuit in which the bypass switch is on are fully charged.

Effect of the Invention

According to the aspect described above, it is possible to provide a battery system capable of continuing to supply power to a load even while operating to disconnect a fully discharged battery.

DESCRIPTION OF EMBODIMENTS

First Embodiment

Hereinafter, a first embodiment of the present invention will be described based on FIG. 1. A battery system 1 shown in FIG. 1 is, for example, a device mounted on an EV or HEV vehicle driven by an electric motor and supplying power to the electric motor.

As shown in FIG. 1, the battery system 1 includes a plurality of battery units 11a to 11e, a plurality of voltage measurement units 12a to 12e, and a control unit 13. The plurality of battery units 11a to 11e has the same configuration. In the present embodiment, the battery unit 11a will be described as a representative. Incidentally, in the battery units 11b to 11e, "a" in the description of the battery unit 11a can be replaced with "b" to "e" respectively, and the detailed description will be omitted.

The battery unit 11a includes a battery 111a and a switching unit 112a.

The battery 111a is a chargeable/dischargeable storage battery, and may be configured of one cell or may be configured of a plurality of cells. In the present embodiment, the used batteries used on a vehicle are used as the batteries 111a to 111e provided in the plurality of battery units 11a to 11e. The deterioration state of the used battery used for the vehicle is measured, and the batteries 111a to 111e are sorted so that the total capacity of the plurality of batteries 111a to 111e becomes a desired capacity. At this time, the battery deterioration degrees of the batteries 111a to 111e do not have to be the same, and the total capacity of the batteries 111a to 111e may be a desired capacity.

The switching unit 112a is provided switchably between a connected state in which the corresponding battery 111a is used as a power supply and a non-connected state not used as a power supply. More specifically, the batteries switched to the connected state by the switching units 112a to 112e are connected in series, and the batteries switched to the unconnected state by the switching units 112a to 112e are disconnected from the connected batteries.

The switching unit 112a includes a first switch SW1a connected in series to the battery 111a, and a second switch SW2a connected in parallel to the battery 111a and the first switch SW1a. Now, one end T11 of the first switch SW1a is connected to one electrode (for example, positive electrode) of the corresponding battery 111a. One end T21 of the second switch SW2a is connected to the other electrode (for example, negative electrode) of the corresponding battery 111a, and the other end T22 is connected to the other end T12 of the first switch SW1a.

The battery units 11a to 11e described above are connected in series, and both ends thereof are connected to a DC/AC converter 14 that converts direct current into alternating current. That is, the other end T12 of the first switch SW1a and the other end T22 of the second switch SW2a provided in the battery unit 11a on one side (the left side in FIG. 1) in an arrangement direction of the battery units 11a to 11e are connected to the DC/AC converter 14. Further, the other electrode of the battery 111e and one end T21 of the second switch SW2e provided in the battery unit 11e on the other end side (the right side in FIG. 1) in the arranging direction are connected to the DC/AC converter.

Further, first switches SW1b, . . . , SW1e are connected between the batteries 111a and 111b, . . . , 111d and 111e adjacent to each other. Further, one ends T21 of the second switches SW2a, . . . , 2d and the other ends T22 of the second switches SW2b, . . . , 2e of the battery units 11a and 11b, . . . , 11d and 11e adjacent to each other are connected to each other.

According to the above configuration, when the second switch SW2a is turned off and the first switch SW1a is turned on, the battery 111a is in the connected state. when the first switch SW1a is turned off, and the second switch SW2a is turned on, the battery 111a is in the disconnected state.

The plurality of voltage measurement units 12a to 12e measures the voltages across the corresponding batteries 111a to 111e, and outputs the measurement results to the control unit 13 described later.

The control unit 13 includes well-known CPU, ROM, and RAM, and controls the entire battery system 1. The control unit 13 turns on and off the first switches SW1a to SW1e and the second switches SW2a to SW2e based on the voltages across the batteries 111a to 111e.

Figure 2:
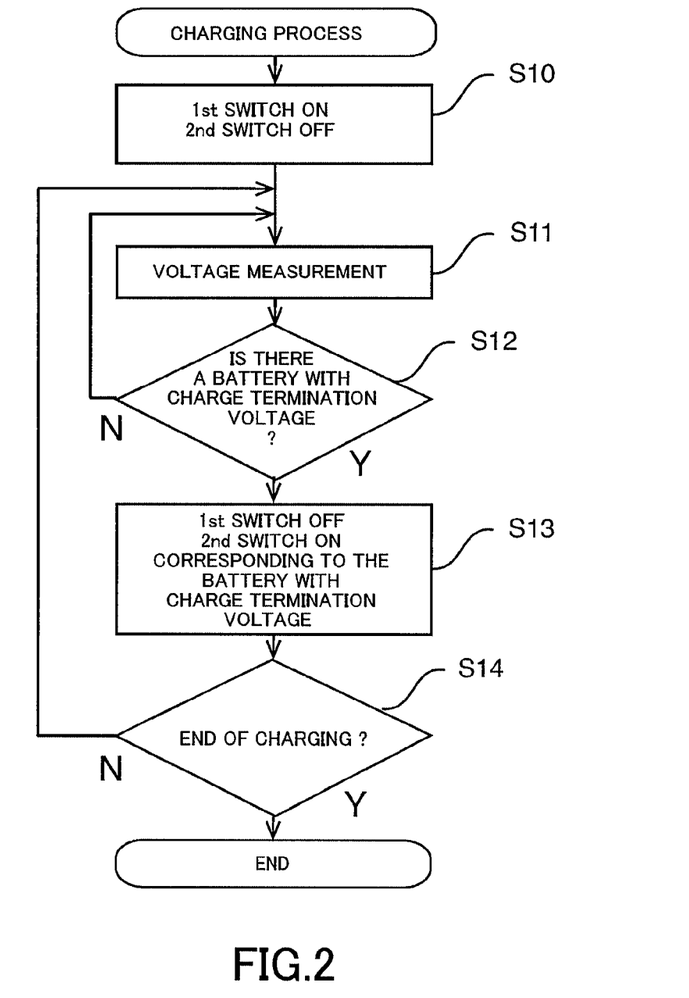
FIG. 2 is a flowchart showing a charging process procedure of a control unit shown in FIG. 1.

Next, the operation of the battery system 1 configured as described above will be described with reference to the flowcharts of FIGS. 2 and 3. First, when charging of the battery system 1 is started, the control unit 13 starts the charging process shown in FIG. 2. First, the control unit 13 turns on the first switches SW1a to SW1e after turning off the second switches SW2a to SW2e of all the battery units 11a to 11e (step S10). As a result, all the batteries 111a to 111e are connected in series, and charged.

Next, the control unit 13 measures the voltages across the batteries 111a to 111e using the voltage measurement units 12a to 12e (step S11). The control unit 13 determines whether there is any of the plurality of batteries 111a to 111e that has reached a predetermined charge termination voltage (step S12). If there is no battery that has reached the charge termination voltage (N in step S12), the control unit 13 determines that none of the batteries 111a to 111e is fully charged, and returns to step S11.

On the other hand, if there is any of batteries 111a to 111e that has reached the charge termination voltage (Y in step S12), the control unit 13 determines that the any of batteries 111a to 111e is fully charged, and any of the first switches SW1a to SW1e is turned off, and any of the second switches SW2a to SW2e is turned on corresponding to the fully charged battery (step S13). Thus, any of the batteries 111a to 111e in the fully charged state are switched to the non-connected state, and the charging is stopped. Thereafter, the control unit 13 proceeds to step S14.

In step S14, the control unit 13 determines whether or not charging has ended. If the charging is ended (Y in step S14), the control unit 13 ends the charging process. On the other hand, if the charging is not ended (N in step S14), the control unit 13 returns to step S11 again.

Figure 3:
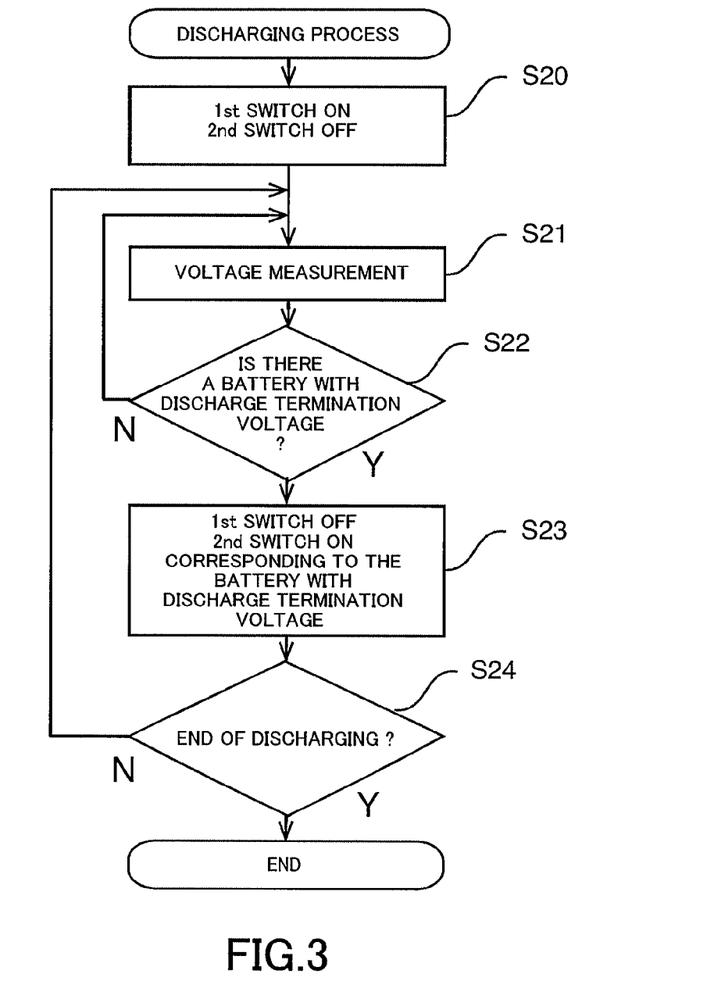
FIG. 3 is a flowchart of a discharging process procedure of the control unit shown in FIG. 1.

Further, when the discharge of the battery system 1 is started, the control unit 13 starts the discharging process shown in FIG. 3. First, the control unit 13 turns on the first switches SW1a to SW1e after turning off the second switches SW2a to SW2e of all the battery units 11a to 11e (step S20). As a result, all the batteries 111a to 111e are connected in series, and discharged.

Next, the control unit 13 measures the voltages across the batteries 111a to 111e using the voltage measurement units 12a to 12e (step S21). The control unit 13 determines whether there is any of the plurality of batteries 111a to 111e that has reached a predetermined discharge termination voltage (step S22). If there is no battery that has reached the discharge termination voltage (N in step S22), the control unit 13 determines that none of the batteries 111a to 111e is fully discharged, and returns to step S21.

On the other hand, if there is any of batteries 111a to 111e that has reached the discharge termination voltage (Y in step S22), the control unit 13 determines that the any of batteries 111a to 111e is fully discharged, and any of the first switches SW1a to SW1e is turned off, and any of the second switches SW2a to SW2e is turned on corresponding to the fully discharged battery (step S23). Thus, any of the batteries 111a to 111e in the fully discharged state are switched to the non-connected state, and the discharging is stopped. Thereafter, the control unit 13 proceeds to step S24.

In step S24, the control unit 13 determines whether or not discharging has ended. If the discharging is ended (Y in step S24), the control unit 13 ends the discharging process. On the other hand, if the discharging is not ended (N in step S24), the control unit 13 returns to step S21 again.

Next, an example of the operation of the above-described battery system 1 will be described assuming that the deterioration progresses from the battery 111a to the battery 111e. When the battery system 1 is charged, the control unit 13 firstly turns off the second switches SW2a to SW2e, and then turns on the first switches SW1a to SW1e of all the battery units 11a to 11e. Thus, at the start of charging, all the batteries 111a to 111e are charged. Thereafter, since the voltage across the most advanced deterioration battery 111e reaches the charge termination voltage, the control unit 13 turns off the first switch SW1e and turns on the second switch SW2e. As a result, the battery 111e is disconnected, and charging is continued as the battery system 1 configured by the batteries 111a to 111d.

Next, since the voltage across the battery 111d in which the battery deterioration has advanced second reaches the charge termination voltage, the control unit 13 turns off the first switch SW1d and turns on the second switch SW2d. As a result, the battery 111d is also disconnected, and charging is continued as the battery system 1 configured of the battery 111a to the battery 111c. By repeating this process up to one battery, charging can be performed until the states of charge SOC of all the batteries 111a to 111e reach 100% (=full charge state).

On the other hand, when the battery system 1 is discharged, the control unit 13 first turns off the second switches SW2a to SW2e of all the battery units 11a to 11e and then turns on the first switches SW1a to SW1e. Thus, at the start of the discharge, all the batteries 111a to 111e are discharged. Thereafter, since the voltage across the most advanced deterioration battery 111e reaches the discharge termination voltage, the control unit 13 turns off the first switch SW1e and turns on the second switch SW2e. As a result, the battery 111e is disconnected, and the discharge is continued as the battery system 1 configured of the batteries 111a to 111d.

Next, since the voltage across the battery 111d in which the battery deterioration has advanced second reaches the discharge termination voltage, the control unit 13 turns off the first switch SW1d and turns on the second switch SW2d. As a result, the battery 111d is also disconnected, and the discharge is continued as the battery system 1 configured of the battery 111a to the battery 111c. By repeating this process up to one battery, discharge can be performed until the state of charge SOC of all the batteries 111a to 111e becomes 0% (=full discharge state).

According to the above-described first embodiment, the control unit 13 controls the plurality of switching units 112a to 112e to be in the connected state in a normal state, and controls the switching units 112a to 112e corresponding to the batteries 111a to 111e determined to be fully charged during charging or fully discharged during discharging to be disconnected. Thus, as described above, all the batteries 111a to 111e can be charged to full charge, and all the batteries 111a to 111e can be discharged to the end of discharge. Therefore, the battery system 1, capable of sufficiently using the capacities of all the batteries 111a to 111e even if the batteries 111a to 111e in different deterioration states are mixed, can be provided at low cost.

Further, according to the first embodiment described above, the switching unit 112a is configured of the first switch SW1a connected in series to the battery 111a, and the second switch SW2a connected in parallel to the battery 111a and the first switch SW1a (for the switching units 112b to 112e, "a" is read as "b" to "e"). Thus, the batteries 111a to 111e can be easily switched between the connected state and the disconnected state using the switches SW1a to SW1e and SW2a to SW2e.

Second Embodiment

Next, a second embodiment of the present invention will be described based on FIG. 4. A significant difference between the first embodiment and the second embodiment is the configuration of the switching units 112a to 112e. In this embodiment, the switching unit 112a will be described as a representative. Incidentally, in the switching units 112b to 112e, "a" in the description of the switching unit 112a can be replaced with "b" to "e", respectively, and the detailed description will be omitted. In the first embodiment described above, the switching unit 112a is configured of two on/off switches SW1a and SW2a, but in the second embodiment, the switching unit 112a is configured of one changeover switch SW3a.

Figure 4:
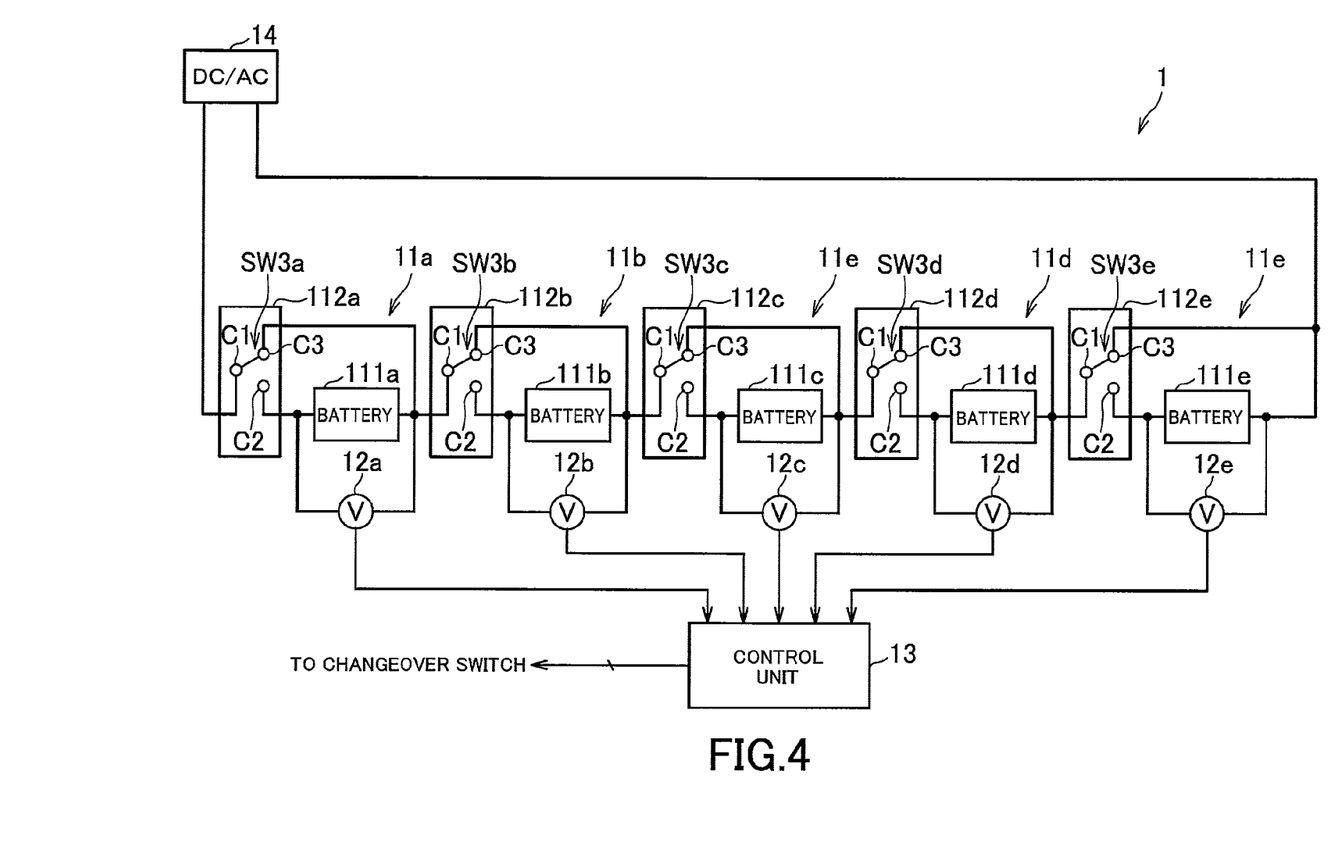
FIG. 4 is a circuit diagram showing a battery system of the present invention in a second embodiment.

Incidentally, in FIG. 4, the same components as those in FIG. 1 already described in the above-described first embodiment are given the same reference signs, and the details thereof are omitted.

The switching unit 112a consists of a changeover switch SW3a that switches the connection of the first contact C1 between the second contact C2 connected to one electrode of the battery 111a and the third contact C3 connected to the other electrode of the battery 111a. Incidentally, the first contact C1 of the changeover switch SW3a is connected to the DC/AC converter 14. The first contacts C1 of the changeover switches SW3b to SW3e are respectively connected to the adjacent batteries 111a to 111d.

According to the above configuration, when the changeover switches SW3a to SW3e are switched to the second contact C2 side, the connected state is established, and when the changeover switches SW3a to SW3e are switched to the third contact C3 side, the disconnected state is established.

Next, the operation of the battery system 1 configured as described above will be described. The operation of the second embodiment is substantially the same as the first embodiment described above with reference to FIGS. 2 and 3. The difference is that in the first embodiment, the control unit 13 turns on the first switches SW1a to SW1e and turns off the second switches SW2a to SW2e in steps S10 and S20, but in the second embodiment, the changeover switches SW3a to SW3e are switched to the second contact C2 side. Further, in the first embodiment, in steps S13 and S23, the control unit 13 turns off the first switches SW1a to SW1e and turns on the second switches SW2a to SW2e corresponding to the batteries 111a to 111e in the fully charged or fully discharged state, but in the second embodiment, the corresponding changeover switches SW3a to SW3e are switched to the third contact C3 side.

Further, according to the second embodiment described above, the switching units 112a to 112e are configured by the changeover switches SW3a to SW3e. Thereby, the batteries 111a to 111e can be easily switched between the connected state and the disconnected state using the changeover switches SW3a to SW3e. Further, a short circuit due to erroneous switching of the first switches SW1a to SW1e and the second switches SW2a to SW2e is prevented.

Third Embodiment

Next, a third embodiment will be described based on FIG. 5. In the third embodiment, a battery circuit group in which a plurality of battery circuits 510, each having a plurality of battery units 11a to 11e connected in series, are connected in parallel is provided. Further, a charge control unit 520 and a load 530 are connected in parallel to both ends of the battery circuit 510. Although not shown in FIG. 5, in the third embodiment, voltage measurement units 12a to 12e for measuring the voltage across the batteries 111a to 111e are provided similar to the first and second embodiments.

Similar to the first embodiment, each of the battery circuits 510 includes switching units 112a to 112e consisting of first switches SW1a to SW1e and second switches SW2a to SW2e. Then, similar to the first embodiment, when the batteries 111a to 111e are neither fully charged nor fully discharged, the first switches SW1a to SW1e are turned on and the second switches SW2a to SW2e are turned off. Thus, the battery units 11a to 11e are in a state (first state) in which the batteries 111a to 111e are connected between the positive electrode ends 113a to 113e and the negative electrode ends 114a to 114e of the battery units 11a to 11e. The batteries 111a to 111e are connected in series to the batteries 111a to 111e of the battery units 11a to 11e in the other first state, and are used as power supplies. Further, when it is determined that the batteries 111a to 111e have reached the fully charged or fully discharged state, the first switches SW1a to SW1e are turned off and the second switches SW2a to SW2e are turned on. As a result, the positive electrode ends 113a to 113e and the negative electrode ends 114a to 114e of the battery units 11a to 11e are connected without the batteries 111a to 111e (second state). The batteries 111a to 111e are separated from the batteries 111a to 111e of the battery units 11a to 11e in the other first state, and are not used as power supplies.

Figure 5:
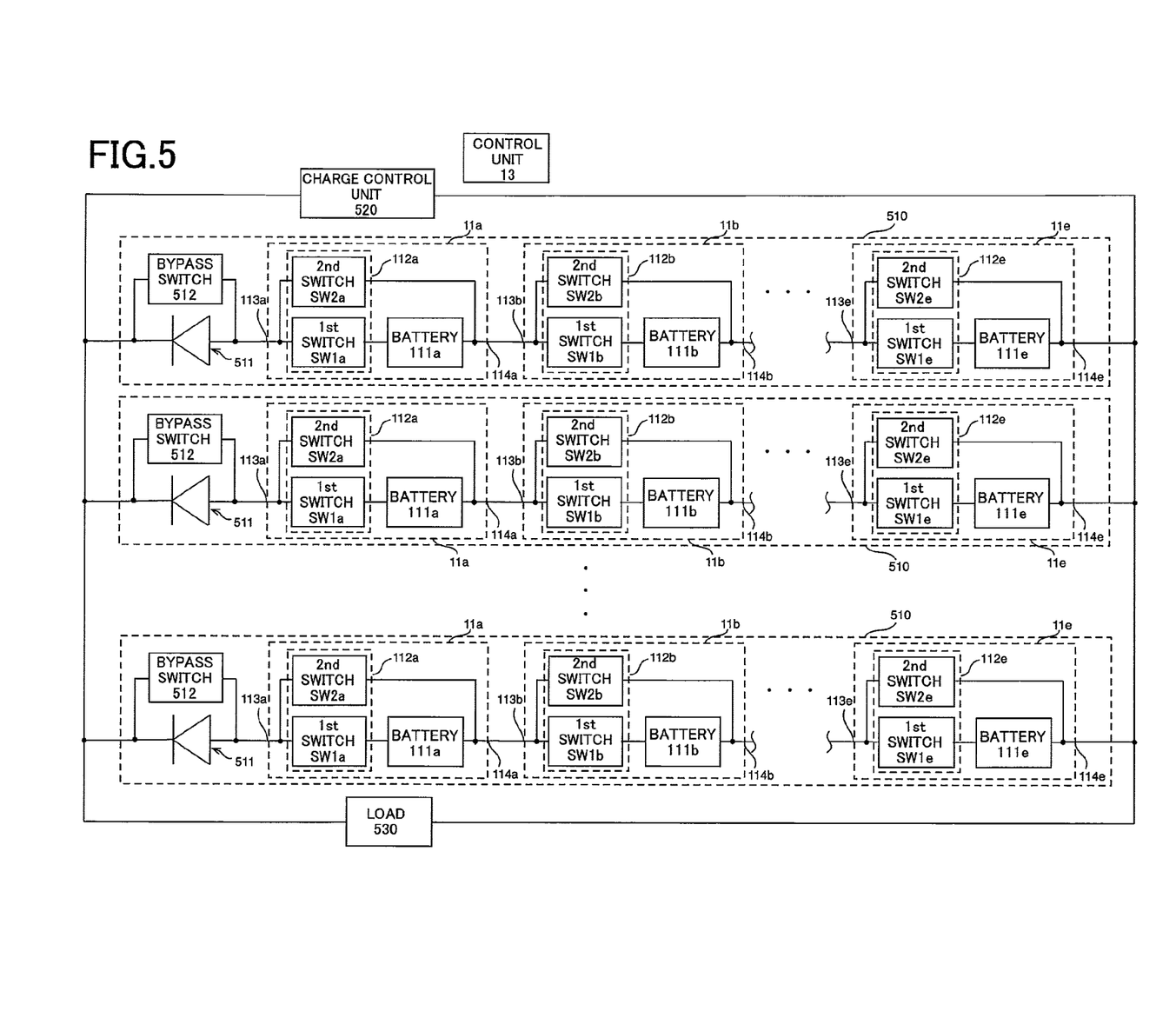
FIG. 5 is a circuit diagram showing a battery system of the present invention in a third embodiment.

Incidentally, in FIG. 5, the switching units 112a to 112e are configured by first switches SW1a to SW1e and second switches SW2a to SW2e. However, instead of this, similar to the second embodiment, the switching units 112a to 112e may be configured by the switching switches SW3a to SW3e. In this case, when the batteries 111a to 111e are neither fully charged nor fully discharged, the contact C1 is connected to the contact C2 in the changeover switches SW3a to SW3e. Thus, the battery units 11a to 11e are in a state (first state) in which the batteries 111a to 111e are connected between the positive electrode ends 113a to 113e and the negative electrode ends 114a to 114e of the battery units 11a to 11e. The batteries 111a to 111e are connected in series to the batteries 111a to 111e of the battery units 11a to 11e in the other first state, and are used as power supplies. In addition, when it is determined that the batteries 111a to 111e have reached the fully charged state or the fully discharged state, the contact C1 is connected to the contact C3 in the changeover switches SW3a to SW3e. As a result, the positive electrode ends 113a to 113e and the negative electrode ends 114a to 114e of the battery units 11a to 11e are connected without the batteries 111a to 111e (second state). The batteries 111a to 111e are separated from the batteries 111a to 111e of the battery units 11a to 11e in the other first states, and are not used as power supplies.

In the first embodiment, during the discharge operation, power supply to the load is stopped while the battery in the fully discharged state is being disconnected, that is, until the first switches SW1a to SW1e are turned off and the second switches SW2a to SW2e are turned on. Further, also in the second embodiment, during the discharging operation, power supply to the load is stopped while the battery in the fully discharged state is being disconnected, that is, until the changeover switches SW3a to SW3e are switched from the second contact C2 to the third contact C3.

Therefore, in the third embodiment, a plurality of battery circuits 510 having the batteries 111a to 111e connected in series is connected in parallel. As a result, even if one of the battery circuits 510 operates to disconnect the fully discharged battery at the time of discharge, current flows through the other battery circuits 510. Therefore, the power supply to the load 530 is not stopped while the operation of disconnecting the fully discharged battery is performed.

Further, in the third embodiment, in each of the plurality of battery circuits 510, the diode 511 is connected in series with the plurality of battery units 11a to 11e such that the discharge direction of the batteries 111a to 111e is the forward direction. For example, in FIG. 5, the positive electrode end 113a of the battery unit 11a is connected to the anode of the diode 510. Therefore, even if the total voltage of each of the plurality of battery circuits 510 is different by disconnecting the battery in the fully discharged state, it is possible to prevent the flow of current from the battery circuit 510 having a high total voltage to the battery circuit 510 having a low total voltage when discharging.

When the plurality of battery circuits 510 is configured as described above, the direction of the current for charging the batteries 111a to 111e is reverse to the forward direction of the diode 511, and the current for charging the batteries 111a to 111e cannot pass through the diode 511. Thus, in the third embodiment, as illustrated in FIG. 5, each of the plurality of battery circuits 510 includes a bypass switch 512 connected in parallel to the diode 511. By turning on the bypass switch 512 at the time of charging, the current for charging the batteries 111a to 111e can bypass the diode 511, and the current for charging the batteries 111a to 111e can be supplied.

In addition, the control unit 13 controls the bypass switches 512 such that the plurality of battery circuits 510 are sequentially charged one by one at the time of charging. That is, the control unit 13 turns on only one bypass switch 512 among the plurality of battery circuits 510, turns off the bypass switch 512 of the other battery circuits 510, and charges only the battery circuit 510 in which the bypass switch 512 is turned on. Then, when charging is completed, the bypass switch 512 is turned off, and only one bypass switch 512 of the other uncharged battery circuits 510 is turned on to charge this battery circuit 510. By continuing such control, the control unit 13 charges the battery circuit 510 sequentially. Therefore, the battery circuits 510 are not connected to each other at the time of charging. Therefore, in the third embodiment, even if the total voltage of each of the plurality of battery circuits 510 is different by disconnecting the fully charged battery, no current flows into the circuit 510 of the battery having a low total voltage from the circuit 510 of the battery having a high total voltage.

Figure 6:
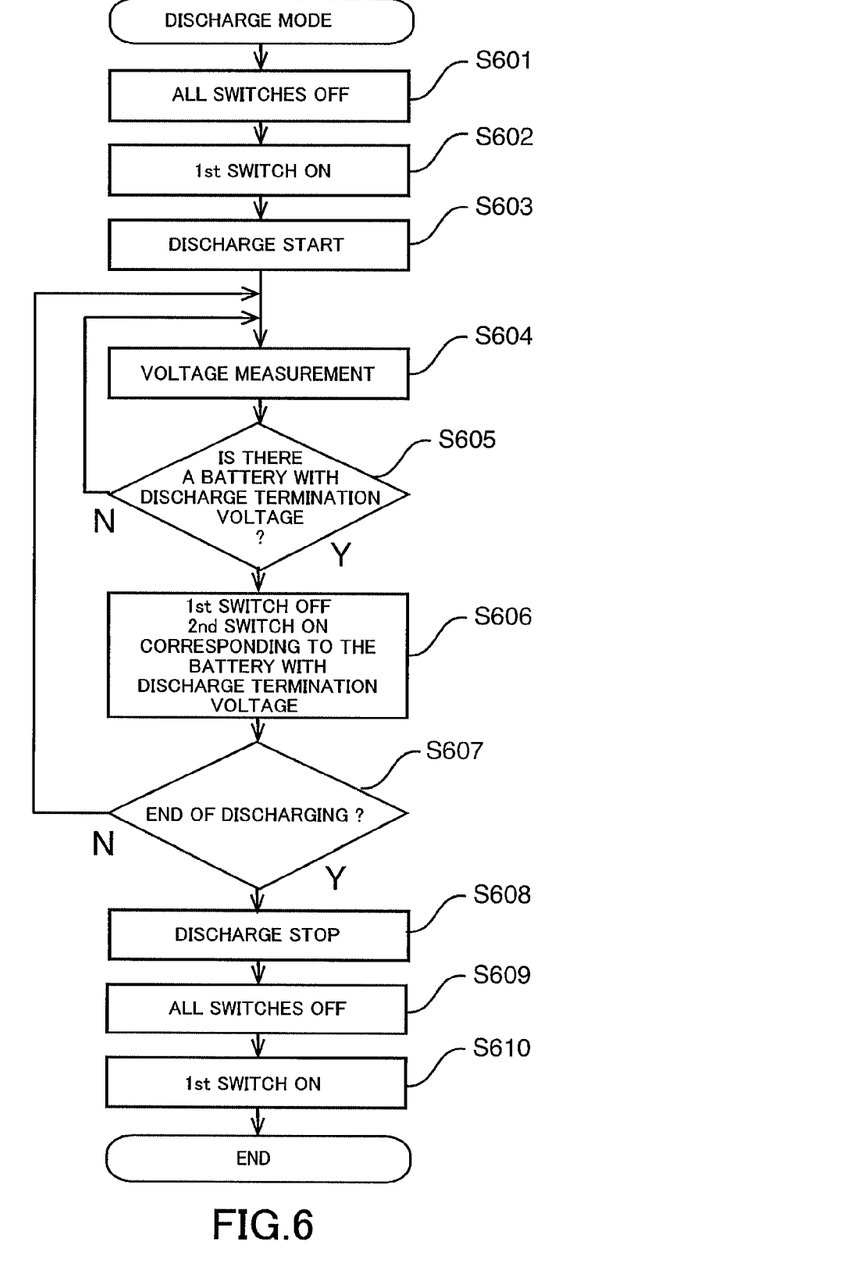
FIG. 6 is a flowchart showing a charging processing procedure of the control unit shown in FIG. 5.

FIG. 6 is a flowchart showing the operation at the time of discharge in the third embodiment. All of the first switches SW1a to SW1e, the second switches SW2a to SW2e, and the bypass switch 512 are turned off (step S601). The first switches SW1a to SW1e are turned on (step S602). Thereafter, the discharge is started (step S603).

Next, the control unit 13 measures the voltages across the batteries 111a to 111e (step S604). The control unit 13 determines whether there is any of the plurality of batteries 111a to 111e that has reached a predetermined discharge termination voltage (step S605). If there is no battery 111a to 111e that has reached the discharge termination voltage (N in step S605), the control unit 13 determines that none of the batteries 111a to 111e is fully discharged, and returns to step S604.

On the other hand, if there is a battery 111a to 111e that has reached the discharge termination voltage (Y in step S605), the control unit 13 determines that this one of the batteries 111a to 111e is in the fully discharged state, and one of the first switches SW1a to SW1e is turned off, and the one of the second switches SW2a to SW2e is turned on corresponding to this one of the batteries 111a to 111e (step S606). As a result, the connection of any of the batteries 111a to 111e in the fully discharged state is switched to the disconnected state, and the discharge of any of the batteries 111a to 111e in the fully discharged state is stopped. Thereafter, the control unit 13 proceeds to step S607.

In step S607, the control unit 13 determines whether the discharge of all the batteries 111a to 111e has been stopped, that is, whether the discharge of all the batteries 111a to 111e has ended. If the discharge of all the batteries 111a to 111e is ended (Y in step S607), the control unit 13 stops the discharge (S608), and all of the first switches SW1a to SW1e, the second switches SW2a to SW2e, and the bypass switches 512 are turned off (step S609), and the first switches SW1a to SW1e are turned on (step S610). On the other hand, if the discharge of all the batteries 111a to 111e is not ended (N in step S606), the control unit 13 returns to step S604 again.

Figure 7:
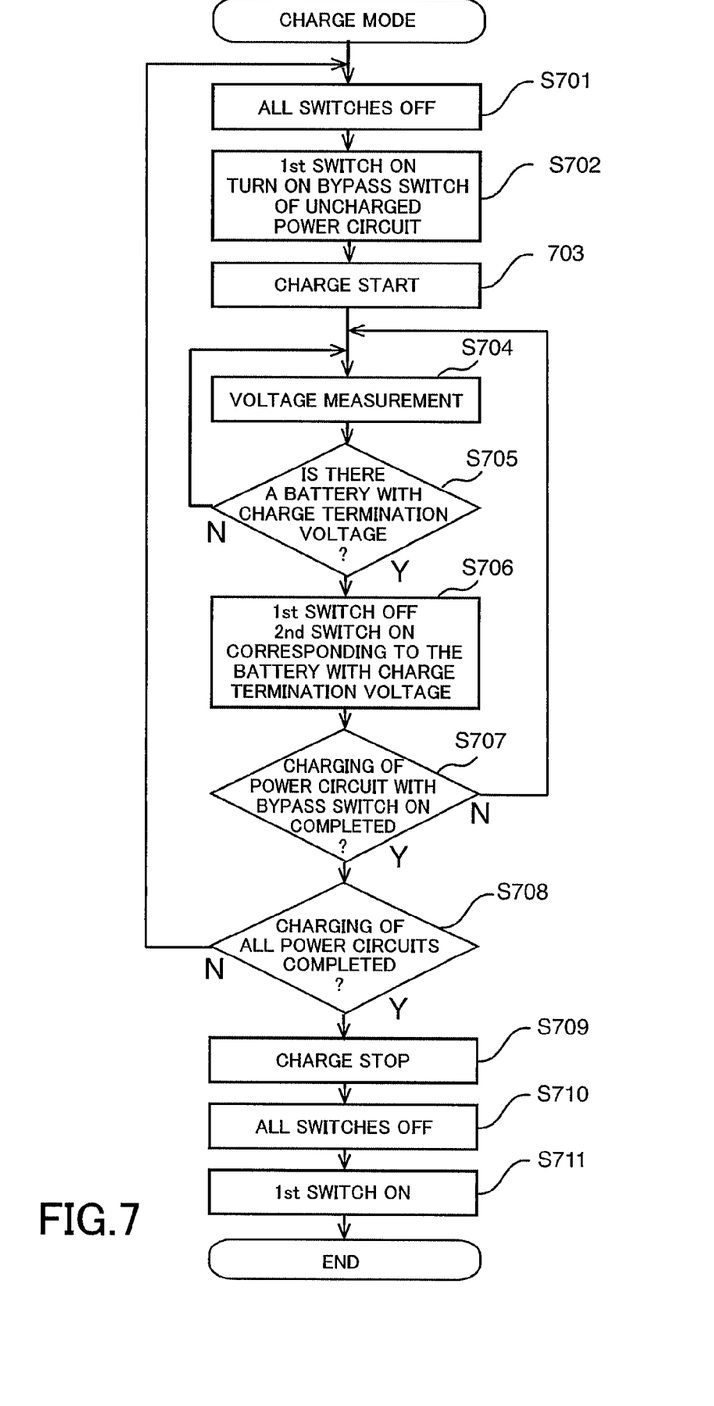
FIG. 7 is a flowchart of a discharging process procedure of the control unit shown in FIG. 5.

FIG. 7 is a flowchart showing the operation at the time of charging in the third embodiment. All of the first switches SW1a to SW1e, the second switches SW2a to SW2e, and the bypass switches 512 are turned off (step S701). The first switches SW1a to SW1e are turned on, and only the bypass switch 512 of one battery circuit 510 among the battery circuits 510 not yet charged is turned on (step S702). Thereafter, charging is started (step S703).

Next, the control unit 13 measures the voltage across the batteries 111a to 111e (step S704). The control unit 13 determines whether there is any of the plurality of batteries 111a to 111e that has reached a predetermined charge termination voltage (step S705). If there is no battery 111a to 111e that has reached the charge termination voltage (N in step S705), the control unit 13 determines that none of the batteries 111a to 111e is fully charged, and returns to step S704.

On the other hand, if there is any of batteries 111a to 111e that has reached the charge termination voltage (Y in step S705), the control unit 13 determines that this one of the battery 111a to 111e is fully charged, and the first switches SW1a to SW1e are turned off, and the second switches SW2a to SW2e are turned on corresponding to this one of the batteries 111a to 111e (step S706). Thereby, the connection of any of the batteries 111a to 111e in the fully charged state is switched to the disconnected state, and the charging is stopped. Thereafter, the control unit 13 proceeds to step S707.

In step S707, the control unit 13 determines whether charging of all the batteries 111a to 111e of the battery circuit 510 in which the bypass switch 512 is on is stopped or not, that is, whether charging of the battery circuit 510 with the bypass switch 512 turned on has ended (S707). If the charging of the battery circuit 510 in which the bypass switch 512 is on has been ended (Y in step S707), the control unit 13 proceeds to step S708. If the charging of the battery circuit 510 for which the bypass switch 512 is on has not been ended (N in step S707), the process returns to step S704 again.

In step S708, the control unit determines whether charging of all the battery circuits 510 has ended. If charging of all the battery circuits 510 is ended (Y in step S708), the control unit 13 stops the discharge (S709), and all of the first switches SW1a to SW1e, the second switches SW2a to SW2e, the bypass switches 512 are turned off (step S710), and the first switches SW1a to SW1e are turned on (step S711). On the other hand, if the discharge of all the batteries 111a to 111e is not ended (N in step S708), the control unit 13 returns to step S701 again.

Incidentally, the present invention is not limited to the above embodiments. That is, various modifications can be made without departing from the scope of the present invention.

REFERENCE SIGNS LIST 1 battery system
11a-11e battery unit
13 control unit
111a-111e battery
112a-112e switching unit
C1 first contact
C2 second contact
C3 third contact
SW1a-SW1e first switch
SW2a-SW2e second switch
SW3a-SW3e changeover switch
510 power circuit
511 diode
512 busbar switch
520 charge control unit
530 load

The invention claimed is:

1. A battery system comprising:
a battery circuit group in which a plurality of battery circuits connected in parallel, each including a plurality of battery units connected in series, each including a positive electrode end, a negative electrode end, a battery and a switching unit; and
a control unit that determines a charge state of the battery and controls the switching unit based on the determined charge state,
wherein in each of the battery units, the switching unit switches a state of the battery unit between a first state, in which the battery is connected between the positive electrode end and the negative electrode end, and a second state, in which the positive electrode end and the negative electrode end are connected without the battery,
wherein when discharging of the battery circuit group, the control unit controls the switching unit such that the state of the battery unit including the battery determined to be not fully discharged becomes the first state, and the state of the battery unit including the battery determined to be fully discharged becomes the second state,
wherein each of the battery circuits has a diode connected in series with the plurality of battery units such that a discharge direction of the battery is a forward direction, and
wherein the control unit controls the switching unit such that when charging of the battery circuit group, the state of the battery unit including the battery determined to be not fully charged becomes the first state, and the state of the battery unit including the battery determined to be fully charged becomes the second state.

2. The battery system as claimed in claim 1,
wherein the control unit determines that the battery is not fully discharged when a voltage across the battery is greater than a predetermined discharge termination voltage, and determines that the battery is fully discharged when the voltage across the battery is less than or equal to the predetermined discharge termination voltage.

3. The battery system as claimed in claim 1,
wherein each of the plurality of battery circuits further includes a bypass switch connected in parallel with the diode.

4. The battery system as claimed in claim 2,
wherein each of the plurality of battery circuits further includes a bypass switch connected in parallel with the diode.

5. The battery system as claimed in claim 3,
wherein the control unit determines that the battery is not fully charged when the voltage across the battery is less than a predetermined charge termination voltage, and determines that the battery is fully charged when the voltage across the battery is equal to or greater than the predetermined charge termination voltage.

6. The battery system as claimed in claim 4,
wherein the control unit determines that the battery is not fully charged when the voltage across the battery is less than a predetermined charge termination voltage, and determines that the battery is fully charged when the voltage across the battery is equal to or greater than the predetermined charge termination voltage.

7. The battery system as claimed in claim 3,
wherein the control unit controls the bypass switches such that only one bypass switch of the battery circuit is turned on, and controls the bypass switch so as to sequentially charge the plurality of battery circuits by controlling the bypass switch such that the bypass switch is turned off when it is determined that all the batteries in the battery circuit in which the bypass switch is on are fully charged.

8. The battery system as claimed in claim 4,
wherein the control unit controls the bypass switches such that only one bypass switch of the battery circuit is turned on, and controls the bypass switch so as to sequentially charge the plurality of battery circuits by controlling the bypass switch such that the bypass switch is turned off when it is determined that all the batteries in the battery circuit in which the bypass switch is on are fully charged.

9. The battery system as claimed in claim 5,
wherein the control unit controls the bypass switches such that only one bypass switch of the battery circuit is turned on, and controls the bypass switch so as to sequentially charge the plurality of battery circuits by controlling the bypass switch such that the bypass switch is turned off when it is determined that all the batteries in the battery circuit in which the bypass switch is on are fully charged.

10. The battery system as claimed in claim 6,
wherein the control unit controls the bypass switches such that only one bypass switch of the battery circuit is turned on, and controls the bypass switch so as to sequentially charge the plurality of battery circuits by controlling the bypass switch such that the bypass switch is turned off when it is determined that all the batteries in the battery circuit in which the bypass switch is on are fully charged.

11. The battery system as claimed in claim 1,
wherein the switching unit includes a first switch connected in series with the battery and a second switch connected in parallel with the battery.

12. The battery system as claimed in claim 11,
wherein the first switch is turned on and the second switch is turned off in the first state, and
the first switch is turned off and the second switch is turned on in a second state.

13. The battery system as claimed in claim 11,
wherein the second switch is connected in parallel with each of the first switch and the battery.

* * * * *